(12) United States Patent
Kaufmann et al.

(10) Patent No.: US 9,242,300 B2
(45) Date of Patent: Jan. 26, 2016

(54) TOOL HOLDER FOR GROOVE CUTTING TOOL, GROOVE INSERT AND GROOVE CUTTING TOOL

(71) Applicant: Kennametal Inc., Latrobe, PA (US)

(72) Inventors: Igor Kaufmann, Nürnberg (DE); Anwar Sadat Mohideen Abdul, Nürnberg (DE)

( * ) Notice: Subject to any disclaimer, the term of this patent is extended or adjusted under 35 U.S.C. 154(b) by 267 days.

(21) Appl. No.: 13/971,942

(22) Filed: Aug. 21, 2013

(65) Prior Publication Data

US 2014/0161547 A1    Jun. 12, 2014

(30) Foreign Application Priority Data

Sep. 4, 2012   (DE) .................. 10 2012 017 424

(51) Int. Cl.
*B23B 27/04*    (2006.01)
*B23B 27/16*    (2006.01)
*B23B 29/04*    (2006.01)
*B23C 5/22*     (2006.01)

(52) U.S. Cl.
CPC ............. *B23B 27/1666* (2013.01); *B23B 27/04* (2013.01); *B23B 29/043* (2013.01); *B23C 5/22* (2013.01); *B23B 2205/02* (2013.01); *B23B 2260/0785* (2013.01); *Y10T 407/2212* (2015.01); *Y10T 407/2282* (2015.01); *Y10T 407/2286* (2015.01); *Y10T 407/2288* (2015.01); *Y10T 407/25* (2015.01); *Y10T 407/28* (2015.01)

(58) Field of Classification Search
CPC .... B23B 27/04; B23B 27/16; B23B 27/1625; B23B 27/164; B23B 27/1666; B23B 29/043; B23B 29/06; B23B 29/14; B23B 2220/12; Y10T 407/193; Y10T 407/1932; Y10T 407/194
USPC ............ 407/72, 91, 102, 104, 107, 109, 110, 407/111, 113, 117; 81/177.85
See application file for complete search history.

(56) References Cited

U.S. PATENT DOCUMENTS

| 383,103 A | 5/1888 | Cook |
|---|---|---|
| 1,707,903 A | 4/1929 | Charlton et al. |
| 3,785,021 A | 1/1974 | Norgren |
| 3,894,322 A | 7/1975 | Pano et al. |
| 4,230,428 A | 10/1980 | Haug et al. |

(Continued)

FOREIGN PATENT DOCUMENTS

| AT | 4597 U1 | 9/2001 |
|---|---|---|
| AT | 6939 U1 | 6/2004 |

(Continued)

OTHER PUBLICATIONS

Official_Action dated Jan. 24, 2013.

(Continued)

*Primary Examiner* — Daniel Howell
*Assistant Examiner* — Nicole N Ramos
(74) *Attorney, Agent, or Firm* — Larry R. Meenan

(57) ABSTRACT

A groove cutting tool has a groove insert and a tool holder. The groove insert can be replaced by using a lever tool. The lever tool penetrates into a slot by way of an ejector portion and is able to assume several positions in the slot either in order to contact the groove insert and to push it out of its receiving means or in order to push away a clamping jaw and to open the receiving means for the groove insert.

13 Claims, 2 Drawing Sheets

(56) References Cited

U.S. PATENT DOCUMENTS

| | | | |
|---|---|---|---|
| 4,580,930 A | * | 4/1986 | Zinner .................. 407/110 |
| 4,645,385 A | | 2/1987 | Keller et al. |
| 5,035,545 A | | 7/1991 | Zinner |
| 5,085,541 A | | 2/1992 | Simpson, III |
| 5,150,992 A | * | 9/1992 | Friedmann ............. 407/110 |
| 5,161,920 A | | 11/1992 | Zinner et al. |
| 5,411,354 A | | 5/1995 | Gustafsson |
| 5,743,680 A | * | 4/1998 | Von Haas et al. ........... 407/19 |
| 5,803,675 A | | 9/1998 | Von Haas |
| 5,829,924 A | | 11/1998 | Oshnock et al. |
| 5,921,724 A | | 7/1999 | Erickson et al. |
| 5,934,843 A | | 8/1999 | Hansson et al. |
| 5,980,165 A | * | 11/1999 | Hansson et al. ........... 407/107 |
| 6,116,823 A | | 9/2000 | Mihic |
| 6,234,727 B1 | | 5/2001 | Barazani |
| 6,241,429 B1 | | 6/2001 | Schafer et al. |
| 6,572,309 B2 | | 6/2003 | Hansson et al. |
| 6,579,044 B1 | | 6/2003 | Trenkwalder et al. |
| 8,827,598 B2 | | 9/2014 | Henry et al. |
| 2002/0081165 A1 | | 6/2002 | Hecht et al. |
| 2003/0165362 A1 | | 9/2003 | Hecht |
| 2005/0238444 A1 | | 10/2005 | Virtanen et al. |

FOREIGN PATENT DOCUMENTS

| | | | |
|---|---|---|---|
| DE | 3319799 | A1 | 12/1984 |
| DE | 3906822 | A1 | 9/1990 |
| DE | 19739855 | A1 | 4/1999 |
| DE | 69608965 | T2 | 12/2000 |
| DE | 102006055255 | A1 | 6/2008 |
| EP | 0865851 | A1 | 9/1998 |
| JP | 2001138106 | A * | 5/2001 |
| WO | WO 9912680 | A1 * | 3/1999 |
| WO | 2009141815 | A1 | 11/2009 |

OTHER PUBLICATIONS

Non-Final Rejection.

* cited by examiner

TOOL HOLDER FOR GROOVE CUTTING TOOL, GROOVE INSERT AND GROOVE CUTTING TOOL

CLAIM TO PRIORITY

This application is a National entry application of German Application No. 102012017424.1, filed on Sep. 4, 2012, the entire contents of which is incorporated herein by reference.

FIELD OF THE INVENTION

The invention relates to a tool holder for a groove cutting tool, to a groove insert and to the groove cutting tool itself.

BACKGROUND OF THE INVENTION

Groove inserts are built into rotary cutters or also milling cutters as a replaceable unit in order to be replaced when worn. Groove inserts are extremely small in size such that their secure fastening in the tool holder has to be ensured, also in the case of a lateral feed.

The groove inserts have lateral faces which are exposed in the tool, i.e. the groove inserts are received in a positively locking manner in the receiving means between their top surface and their bottom surface, possibly also their rear surface and are held by means of a clamping force. The opening of the receiving means for replacing the cutting insert is effected by means of a separate lever tool which is to be placed in position laterally and has a bearing continuation which penetrates into an opening in the tool holder and an ejector continuation which penetrates into a rear slot which proceeds from the receiving means. By pivoting the lever tool, the ejector continuation slips along a path and impacts against the bottom surface of the clamping jaw in order to raise said clamping jaw and to spread open the receiving means. As an alternative to this, the ejector continuation can be pressed against the rear surface of the groove insert in order to push said groove insert in the clamped state out of the receiving means.

As an alternative to this, there are solutions where the ejector continuation is able to penetrate into an opening of the clamping jaw and the clamping jaw is able to be moved directly upward.

DE 197 39 855 A1 shows a groove cutting tool having a tool holder where there is a slot on the rear surface proceeding from the receiving means. Said slot has a portion which is greater in cross section and into which the ejector continuation penetrates when inserted, and a connecting portion which tapers toward the receiving means and into which the ejector continuation is pressed when the tool holder is opened. When pivoting the lever tool in the direction of the groove insert, the clamping jaw is pressed upward and the groove insert is able to be pulled out.

SUMMARY OF THE INVENTION

It is the object of the invention to create a tool holder which simplifies the replacing of the groove insert. Furthermore, a groove insert which is optimized to the tool holder according to the invention is to be provided as well as a groove cutting tool which is distinguished by easier replacement of the cutting insert.

The tool holder according to the invention of a groove cutting tool has a receiving means for a groove insert, where the receiving means is defined on one side by a clamping jaw and on the other side by a base of the tool holder, and where the receiving means at the back of the groove insert merges into a slot which separates the clamping jaw from the base. The slot forms a connecting link for an ejector continuation of a lever tool which can be inserted laterally into the slot, and has several portions. Provided are a central insertion portion, an ejector portion which is adjacent to the insertion portion and leads to the receiving means as well as an expanding portion which leads from the insertion portion in the direction of the slot bottom for opening the receiving means.

In the case of the tool holder according to the invention there are a total of at least three positions for the lever tool. Along with the insertion portion which enables the insertion of the lever tool, it is possible to push out the groove insert directly in a direction proceeding from the insertion portion by the ejector portion pushing directly against the groove insert in order to release it from the support. The expanding portion proceeds from the insertion portion in the opposite direction, the slot tapering in this case. When the ejector continuation is moved out of the insertion portion into the expanding portion or when it is moved along the expanding portion, the ejector continuation presses against the bottom surface of the clamping jaw in order to pivot up said clamping jaw. The tool holder according to the invention consequently allows for either the groove insert to be pushed out directly or, as an alternative to this, the clamping jaw to be raised.

Between the insertion portion and the ejector portion and/or the insertion portion and the expanding portion the slot preferably has a stop nose which projects into the slot. Said stop nose separates the three portions from one another such that the ejector continuation of the lever tool initially has to overcome a resistance by slipping along the stop nose and having to push said stop nose away before it is able to pass into an adjacent portion of the slot. Consequently, the positions of the ejector continuation are clearly defined and no unwanted movement of the ejector continuation is able to occur. This has been possible in the past when there was a kind of springing-back of the clamping jaw when the lever tool was inserted.

The stop nose is preferably realized between the ejector portion and the insertion portion on the base-side edge of the slot and/or between the insertion portion and the expanding portion on the tool-holder-side edge of the slot.

According to one embodiment, between the insertion portion and the expanding portion the stop nose can at the same time form a tapering which is responsible for opening the tool holder when the ejector continuation is pressed into the expanding portion.

As an alternative to this or in addition to it, the expanding portion can, however, also have a reducing width proceeding from the insertion portion to the slot bottom.

The tool holder should have at least one pivot bearing opening for the lateral insertion of a pivot bearing continuation on the lever tool. Said pivot bearing continuation can preferably be provided on the base.

One option is also to realize the pivot bearing opening as an elongated hole such that, on the one hand, the pivot bearing opening acts as a pivot bearing and, on the other hand, as a longitudinal guide.

When viewed from the side, the slot can extend in a V-shaped manner, the insertion portion in particular lying in the deepest region of the "V" in this case.

The slot can start from a bottom edge of the receiving means, in particular from the transition of the bottom edge to a rear surface of the receiving means. It has been shown that a slot positioned in such a manner simplifies the realization of the different positions of the lever tool and reinforces clamping force through feed force as the top clamping jaw and the rear system are connected.

The receiving means can be defined at the edge by a profiled holding structure for forming positive locking with the groove insert; this means that the edge of the receiving means is profiled in portions, preferably completely over the entire length. The holding structure is realized, for example, as a V-groove or a trapezoidal groove, in particular as a prism groove. The form of the corresponding edge of the groove insert is complementary to this at least in portions.

The importance of the rear surface of the receiving means, i.e. the rear edge, is not to be underestimated for the supporting of the groove insert. Said edge, according to the preferred embodiment, also has a holding structure with a groove, in particular a prism groove. Said groove merges into the slot.

The ejector portion has a slot width and extends in relation to the pivot bearing opening such that the ejector continuation of the lever tool is pivotable about the pivot bearing opening as far as into the receiving means, preferably without contacting the tool holder and pressing it away directly as a result.

Over and above this, as already explained, the present invention relates to a groove insert for fixing in a tool holder according to the invention. The groove insert has two opposite ends, where a front surface which forms a main free face extends on one end and a rear surface extends on the opposite end. Over and above this, there is a top surface, a bottom surface as well as lateral faces. The main cutting edge is formed between the front surface and the top surface, where a holding structure, which is convex in cross section and is in particular trapezoidal, is realized along the top, the bottom and the rear surface. Between the bottom surface and the rear surface there is a beveled working surface for the lever tool (beveled with reference to the side view).

The lever tool is applied with an own face, the alignment of which is able to be positioned in an optimized manner with respect to the direction of the introduction of force. Once, by pivoting the lever tool in the direction of the groove insert, the ejector continuation is moved in a preferred manner obliquely against the groove insert, an application on the rear surface is avoided.

Laterally between the working surface and the lateral faces in each case there can be a prism face which extends obliquely with respect to the rear surface, with respect to the working surface and with respect to the corresponding lateral faces, i.e. the corners of the groove insert are provided with a bevel in said region. On the one hand, said bevel reduces the volume of the groove insert which is expensive to produce, on the other hand, as a result the ejector continuation does not press against an edge or corner.

The groove insert according to the invention is not an indexable insert, correspondingly it also has only one main cutting edge.

Finally, the invention also relates to a groove cutting tool having a tool holder according to the invention and a groove insert which is insertable into the tool holder so as to be replaceable, in particular a groove insert according to the invention.

One embodiment of the invention provides that the groove cutting tool has a groove insert which has a working surface for the ejector continuation which extends substantially at right angles with respect to the path of movement of the ejector continuation prior to contacting the groove insert. Consequently, the force for ejecting is to be introduced into the groove cutting tool in as perpendicular a manner as possible.

The slot can extend in relation to the pivot bearing opening in such a manner that the ejector continuation, when moving from the insertion portion as far as up to contact with the groove insert, does not exert any expanding force onto the clamping jaw.

In addition, the pivot bearing opening as a longitudinal groove and the lever tool can be realized such that the ejector continuation, when moving out of the insertion portion as far as up to contact with the groove insert, executes a curved, in particular circular-segment-shaped path and/or extends along a linear path when moving along the expanding portion. According to one configuration of the invention, it is provided that the rake face follows the profile of the main lip. The resulting step-shaped geometry of the rake face has a positive effect on chip formation.

BRIEF DESCRIPTION OF THE DRAWINGS

Further features and advantages of the invention are produced from the following description and from the following drawings, to which reference is made and in which.

DETAILED DESCRIPTION OF THE INVENTION

Figure 1:
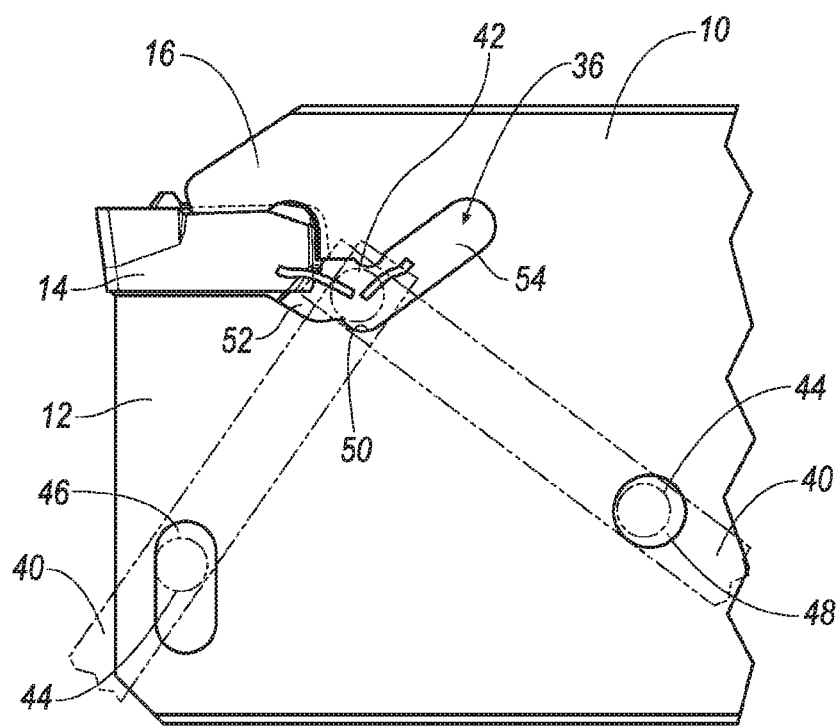
FIG. 1 shows a side view of a portion of the groove cutting tool according to the invention with a tool holder according to the invention and a groove insert according to the invention.

FIG. 1 shows a groove cutting tool, for example for groove cutting. The groove cutting tool includes a tool holder 10 which has a base 12, also called a carrier, for a groove insert 14 as well as a clamping jaw 16 which is integrally formed on the base 12.

In the case of the embodiment shown, the clamping jaw 16 does not have a passage opening for a clamping means in the form of a clamping screw, however this possibility would also be realizable as an alternative.

The clamping jaw 16 presses from above onto the cutting insert 14 and clamps said cutting insert between itself and the base 12.

A so-called receiving means 18, into which the cutting insert 14 penetrates and in which it is also held, is formed between the clamping jaw 16 and the base 12. The receiving means is designated in FIG. 3 by the reference 18.

The receiving means 18 is defined by a top surface 20 of the base which forms a bottom edge of the receiving means 18, a bottom surface 22 of the clamping jaw 16 as well as a rear surface 24 formed in the clamping jaw 16.

As shown by way of dotted lines, the edge forming the top surface 20, the bottom surface 22 and the rear surface 24 preferably has a profiled holding structure for forming positive locking with the cutting insert 14, this being in the form of a groove, in particular a prism groove which can have a V-shaped or trapezoidal form.

Figure 4:
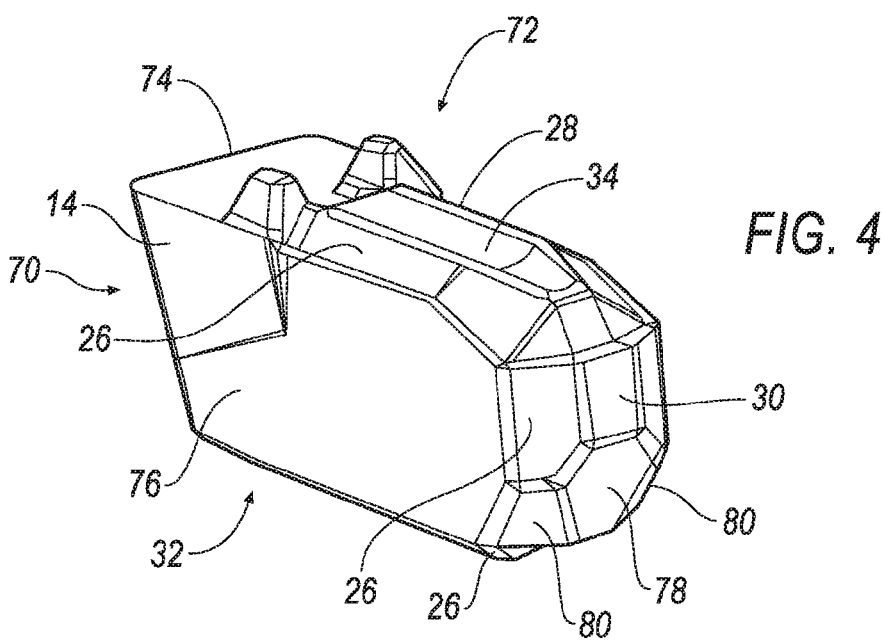
FIG. 4 shows a perspective view obliquely from behind of the groove insert according to the invention.

Corresponding to the faces defining the groove in a lateral manner, the cutting insert shown in FIG. 4 preferably has correspondingly inclined faces 26 such that flat contacts with the edge of the receiving means are produced. The convex holding profile on the top surface 28, the rear surface 30 and the bottom surface 32 of the cutting insert 14 is shown in FIG. 4. In the region of the top surface 28, as an alternative also the rear surface 30 and the bottom surface 32, the profile can be provided with a depression 34 in order to save material. The holding structures produce a positive locking hold for the cutting insert 14 in the tool holder 10.

Figure 3:
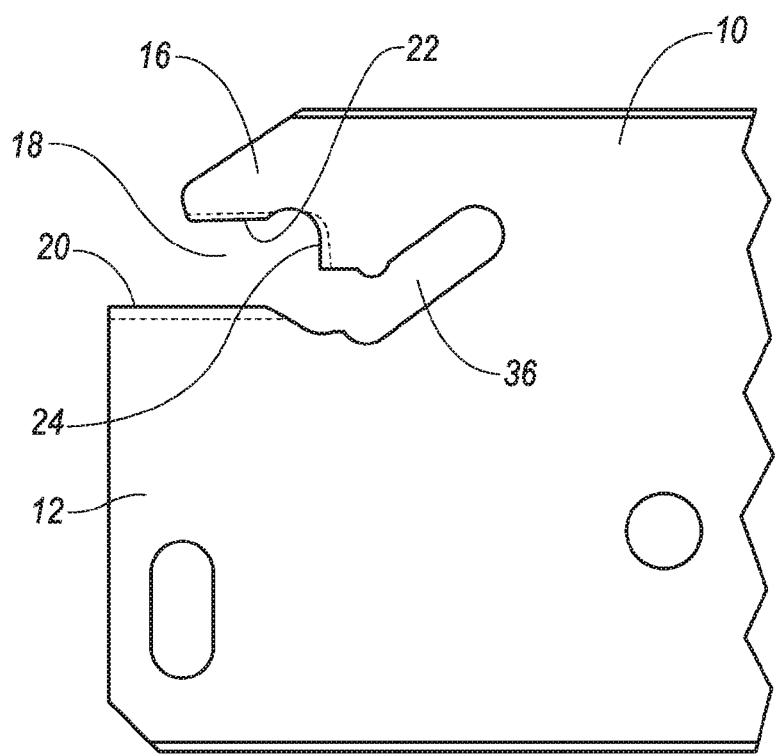
FIG. 3 shows a side view of the tool holder according to the invention according to FIG. 1.

FIG. 3 clearly shows that a slot 36 proceeds from the receiving means 18, said slot together with the recess 18 separating the clamping jaw 16 in portions from the base 12.

The slot 36 proceeds from the rear bottom end of the receiving means 18, i.e. from the transition of the rear surface 24 to the top surface 20 of the base 12.

Figure 2:
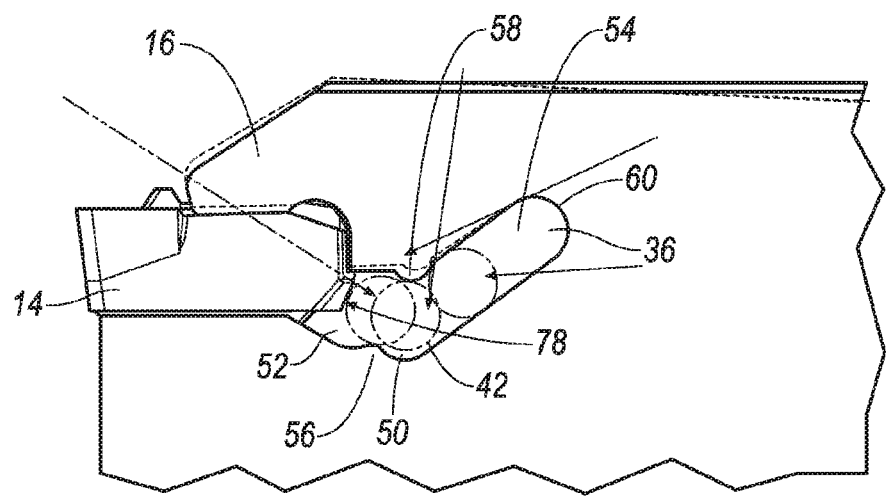
FIG. 2 shows a view of a detail of the groove cutting tool according to FIG. 1 in the region of the groove insert.

The course of the slot can preferably be V-shaped according to FIGS. 1 to 3.

Different portions are produced in the slot 36 and these are explained in the simplest manner in conjunction with a lever tool 40 which is shown in FIG. 1 by way of dot-dash lines.

The lever tool 40 is, for example, a type of rod/strip, from which an ejector continuation 42 as well as a bearing continuation 44, which is at a spacing from said ejector continuation, protrudes laterally. The two continuations 42, 44 are preferably pins which are circular in cross section.

The tool holder 10 has at least one pivot bearing opening 46 in the region of the base 12, two pivot bearing openings 46, 48, which when viewed in the longitudinal direction of the cutting tool are located approximately at the same height but are axially offset with respect to one another, being provided in the exemplary embodiment shown.

In the case of the embodiment shown, which is, however, not to be understood as restricting, the pivot bearing opening 46 is realized as an elongated hole which extends transversely with respect to the longitudinal extension, whereas the pivot bearing opening 48 is a circular opening.

When the bearing continuation is inserted into the pivot bearing opening 46, the ejector continuation 42 penetrates into the central insertion portion 50 of the slot 36 which is shown in FIG. 1.

The form of the slot 36 is realized such that the ejector continuation 42 is able to be inserted laterally exclusively into the insertion portion 50 without having to be pressed into the slot by expending any force.

Proceeding from the insertion portion 50, an ejector portion 52 of the slot 36 extends as far as up to the receiving means 18. In the opposite direction, the slot 36 merges from the insertion portion 50 into an expanding portion 54 which is preferably realized as a rectilinear path.

As can be found, above all, in FIG. 2, in each case a stop nose 56 or 58 is provided between the insertion portion 50 and the ejector portion 52 on the one hand and between the insertion portion 50 and the expanding portion 54. The stop nose 56 which projects into the slot 36 is provided on the base-side edge of the slot 36 and the stop nose 58 is provided between the insertion portion 50 and the expanding portion 54 on the tool-holder-side edge of the slot 36.

Both stop noses 56, 58 are preferably realized as rounded projections. The stop noses 56, 58 are provided for the purpose of forming a resistance for the ejector continuation 42 when said ejector continuation is to be moved from one portion into the adjacent portion 50 to 54. Consequently, the lever tool is always in a clear position.

In the central position of the ejector continuation 42 shown in FIG. 2, said ejector continuation is held between the two stop noses 56, 58. If the lever tool 40 is pivoted about the pivot bearing continuation 44 in the direction of the groove insert 14 (see arrow to the left in FIG. 1), the ejector continuation 42 then slips easily upward on account of the stop nose 56 in order to lift the clamping jaw slightly and in order then to slide it over the stop nose 56. The ejector continuation 42 does not then exert any more force directly onto the clamping jaw 16, but rather is moved in the ejector portion 52 in order to press against the groove insert 14 and to push the same outward out of the support.

If the clamping jaw 16 is to be pressed upward in order to insert a new groove insert 14, the ejector continuation 42 is pressed from the center position, the insertion portion 50, into the expanding portion 54, the ejector continuation 42 in this case having firstly to overcome the stop nose 58 by pressing the clamping jaw 16 far enough upward. In the case of this at least approximately linear movement, the pivot bearing continuation 44 is moved vertically inside the pivot bearing opening 46 which is realized as an elongated hole such that no pure pivoting movement of the lever tool 40 occurs. The ejector continuation 42 presses the stop nose 58 and consequently the clamping jaw 16 upward (see dot-dash line in FIG. 2).

The width of the expanding portion 54 is reduced in the direction toward the bottom 60 of the slot 36. As a consequence, the deeper the ejector continuation 42 is pressed into the expanding portion 54, the wider the receiving means 18 is opened.

In order to achieve a lever action which is better for some situations, the lever tool 40 can also be inserted into the pivot bearing opening 48. As can be seen in FIG. 2, the V-shaped slot 36 has a deepest region in which the insertion portion 50 is located.

As already explained beforehand, the slot 36 proceeds from the bottom edge of the receiving means 18, i.e. from the base-side edge (top surface 20 of the base 12). The groove which forms the holding structure on the tool holder 10 in the region of the base-side bottom edge and of the rear surface 24 (see FIG. 3), merges into the slot 36.

The groove insert 14 according to FIG. 4, which is optimized for the tool holder 10, is explained in more detail below. The groove insert 14 has two opposite ends, a front surface forming a main free face 70 being present on one end and a rear surface 30 which has already been explained on the opposite end. Over and above this, there is the bottom surface 32 and the top surface 28. A main cutting edge 74 is realized at the transition between the front surface and the top surface 72. In a side view, i.e. when looking onto the lateral faces 76, the groove insert is beveled between the bottom surface 32 and the rear surface 30 thus forming a working surface 78 for the ejector continuation 42, said working surface abutting against the rear surface 30 and extending obliquely.

The alignment of the working surface 78 is directed in such a manner in relation to the tool holder 10 that the line of movement (see arrow to the left in FIG. 1) of the ejector continuation 42 is substantially at right angles with respect to the working surface 78 when the ejector continuation 42 impacts against the cutting insert 14.

The edge between the working surface 78 and the respective side wall 76 is also beveled, thus forming a prism face 80. Said prism face 80 is inclined with respect to the rear surface 30, with respect to the working surface 78 and with respect to the lateral faces 76.

In the case of the embodiment shown, the groove insert is not realized as an indexable insert so that the length of the holding structures is as long as possible.

What is claimed is:

1. A tool holder of a groove cutting tool, said tool holder having a receiving means for receiving a groove insert, the receiving means defined on one side by a clamping jaw and on the other side by a base of the tool holder, the receiving means defined by a top surface of the base, a bottom surface of the clamping jaw and a rear surface formed in the clamping jaw, and a slot forms a connecting link for an ejector continuation of a lever tool that can be inserted laterally into the slot, the slot having a central insertion portion, an ejector portion extending from the central insertion portion to the receiving means, and an expanding portion extending from the central insertion portion at an upward angle to a bottom of the slot, wherein the slot has a first stop nose projecting into the slot between the central insertion portion and the ejector portion and a second stop nose projecting into the slot between the insertion portion and the expanding portion, and wherein the ejector continuation presses against the groove insert to push the groove insert out of the receiving means when moved from the central insertion portion of the slot, over the first stop nose, and into the ejector portion of the slot, and wherein the ejector continuation presses the clamping jaw upward to insert the groove insert into the receiving means when moved from the central insertion portion of the slot, over the second stop nose, and into the expanding portion of the slot.

2. The tool holder as claimed in claim 1, wherein the first stop nose projects from the base into the slot and the second stop nose projects from the clamping jaw into the slot.

3. The tool holder as claimed in claim 1, wherein the expanding portion has a reducing width from the central insertion portion to the bottom of the slot.

4. The tool holder as claimed in claim 1, wherein the tool holder has at least one pivot bearing opening for the lateral insertion of a pivot bearing continuation on the lever tool.

5. The tool holder as claimed in claim 4, wherein at least one pivot bearing opening comprises an elongated hole.

6. The tool holder as claimed in claim 4, wherein the ejector portion has a slot width and extends in relation to the pivot bearing opening such that the ejector continuation is pivotable about the pivot bearing opening as far as into the receiving means.

7. The tool holder as claimed in claim 1, wherein the slot has a substantially V-shaped profile when viewed from the side.

8. The tool holder as claimed in claim 1, wherein the slot extends from an intersection between the top surface of base and the rear surface formed in the clamping jaw.

9. The tool holder as claimed in claim 1, wherein the receiving means defines a profiled holding structure for forming positive locking with the groove insert, and wherein the profiled holding structure comprises a prism groove having a V-shaped or a trapezoidal form.

10. A groove insert for fixing in a tool holder, said groove insert having two opposite ends, wherein a front surface which forms a main free face extends on one end and a rear surface extends on the opposite end, and having a top surface, a bottom surface, and lateral faces, wherein a main cutting edge is formed between the front surface and the top surface, and wherein a holding structure, which is trapezoidal in cross section, is located along the top surface, the bottom surface and the rear surface, and wherein a beveled working surface is located between the bottom surface and the rear surface for contacting an ejector continuation of a lever tool, and wherein the working surface is aligned at a substantially right angle with respect to the path of movement of the ejector continuation when the ejector continuation contacts the groove insert.

11. The groove insert as claimed in claim 10, further comprising a prism face extending obliquely with respect to the rear surface, with respect to the working surface, and with respect to the lateral faces.

12. A groove cutting tool having a tool holder as claimed in claim 1 and a groove insert as claimed in claim 10, wherein the tool holder further comprises a pivot bearing opening for the lateral insertion of a pivot bearing continuation on the lever tool, and wherein the slot extends in such a manner in relation to the pivot bearing opening that the ejector continuation does not exert any force directly onto the clamping jaw when moving in the ejector portion of the slot.

13. The groove cutting tool as claimed in claim 12, wherein the ejector continuation moves along a linear path when moving in the expanding portion of the slot.

* * * * *